A. B. Thompson.
Corn Sheller.

N° 103,941. Patented Jun. 7, 1870.

Witnesses.
Truman M. Hubbard
J. G. Newell

Inventor:
A. B. Thompson

UNITED STATES PATENT OFFICE.

AMBROSE B. THOMPSON, OF OWEGO, NEW YORK.

IMPROVEMENT IN CORN-SHELLERS.

Specification forming part of Letters Patent No. 103,941, dated June 7, 1870.

*To all whom it may concern:*

Be it known that I, A. B. THOMPSON, of Owego, in the county of Tioga and State of New York, have invented certain Improvements in Corn-Shellers, of which the following is a specification.

My invention relates to the arrangement of two vertical disks on horizontal shafts, the sides of the disks facing each other, and the inner faces armed with points for shelling, and at the periphery of each disk are teeth, also facing inward, meshing in a pinion by which the disks are connected. The pinion is on an upright shaft, which has a spiral toothed cylinder between the disks. The corn is fed downward in the angles between the upright cylinder and the revolving disks, the object of this plan being to make a double sheller by using two disks and only one cylinder in the center, also to insure positive action in feeding through as corn is pressed against the face of the disk on the side of the center which is rolling down.

Figure 1:
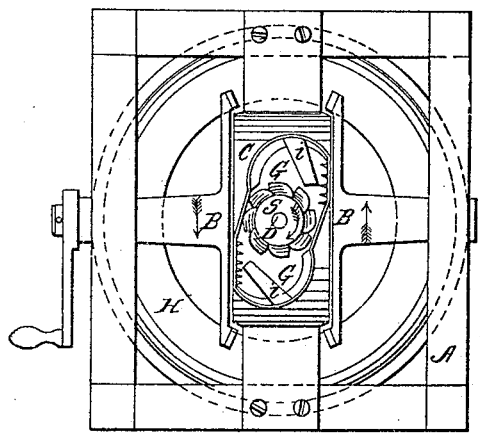
Figure 2:
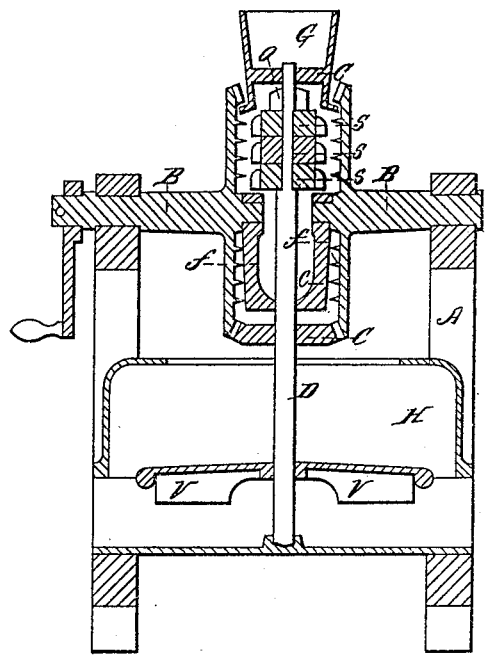
Figure 3:
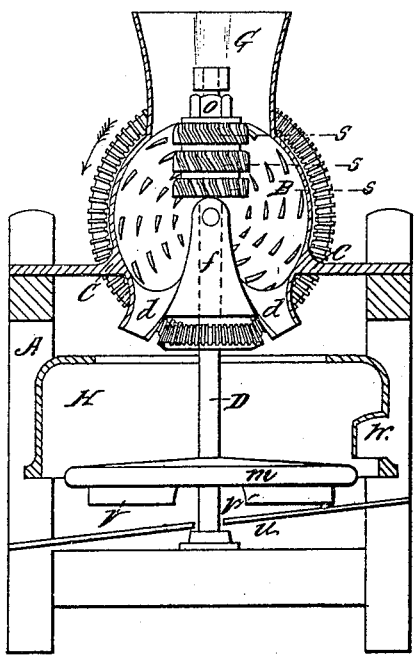

In the accompanying drawings, Figure 1 is a plan showing the top of the machine. Fig. 2 is a vertical transverse section. Fig. 3 is a vertical section of the frame, curb, and iron case. One disk being removed, the face of the other is shown, together with the upright shaft with its cylinder, pinion, and fly-wheel.

A is the frame of the machine, in the upper part of which are hung two horizontal shafts in a line with each other, on which, near their inners ends, are two flat disks, B B. The sides of the disks facing each other are furnished with projecting points, to act on the corn as it passes through, and the outer edge of each disk has teeth, also facing inward, which mesh in a pinion, C, at their lower side, connecting the disk-wheels together.

The pinion C is secured on an upright shaft, D, in the center of the machine, and which extends from the top of the machine to a suitable bearing near the bottom.

An iron case, c, occupies the space between the disks, and a lug projects from each side, by which it is attached to the frame A, Figs. 1 and 3. On the top of the case is a hopper or tube, G, into which corn is thrown in feeding the machine. This hopper is double, (see Fig. 1,) in order to feed through on opposite sides of the vertical cylinder s at the same time, and each side of the tube where corn passes down has a spring, i, to hold the corn against the disk B and the cylinder s.

The sides of the case c are circular, to conform to the disks B B, the teeth for driving being outside the case, so that no corn can get in them, and the points for shelling are inside; and the corn passes into the case through the tube at the top, is shelled inside, and corn and cobs run out at the bottom through two spouts, d d, into the curb H. At the ends of the case, close to the faces of the disks, are two uprights, f f, reaching up from the bottom of the case to the center, to make bearings for the inside ends of the shafts, of which the disks B B form a part. (See Fig. 3.)

On the upright shaft, between the center and top of the disks, is a cylinder made in sections, s s, each section having spiral teeth on its periphery, to shell corn and assist in drawing the ears through. The sections s s are slipped upon the shaft, and fastened thereto by a nut, o, on the shaft above them. The sections may be placed so that the spiral teeth will correspond with each other, forming a continuous screw from top to bottom of the cylinder, or placed so that the points of the teeth on one section will be above the spaces between the teeth of the next one, and so on, the time required to pass corn through the machine being governed in a great degree by the position of the sections with each other, and when they are placed as desired, they are retained in position by the nut o being screwed down upon them. The vertical cylinder occupies the center of the disks B B, so that corn must necessarily pass down at one side of the center, and, as corn is held against the face of the disk on the side of the center which is rolling down, this downward motion, together with the regulating capacity of the sectional cylinder, insures a positive and even rate of speed in feeding through. The process of shelling being completed, corn and cobs fall together upon the top of a smooth plate-wheel, m, on shaft D. (See Figs. 2 and 3.) The wheel m is surrounded by a curb, H, having a diameter sufficient to allow shelled corn to fall between the inside of the curb and the periphery of the wheel m at any point of its circumference, as the corn is thrown out by the motion of the wheel, when it descends, upon an inclined board, *u*, Fig. 3, by which it is carried to the side of the machine. The wheel *m* has wings *v v*, Figs. 2 and 3, attached by their edges to its under side, which throw a current of air outward, sufficient to blow away chaff and dust from the corn as it falls from the wheel *m* to the inclined board *u*. The cobs falling on the wheel *m* are thrown outward to the curb; but there not being room for them to pass down with the corn, they are carried round against the curb by the wheel *m* until they reach an opening, *w*, Fig. 3, in the side of the curb opposite to where the corn is delivered, where they pass out.

What I claim as my invention, and desire to secure by Letters Patent, is—

The disks B B, upright sectional cylinder *s s* on shaft D, with pinion C connecting the disks, substantially in the manner and for the purpose herein described.

AMBROSE B. THOMPSON.

Witnesses:
TRUMAN M. HUBBARD,
F. G. NEWELL.